United States Patent [19]

LaFountain

[11] Patent Number: 4,959,960
[45] Date of Patent: Oct. 2, 1990

[54] METHOD AND APPARATUS FOR PREFILLING HYDRAULIC CONTROL APPARATUS

[75] Inventor: Robert H. LaFountain, Rochester, Mich.

[73] Assignee: Automotive Products plc, Warwickshire, England

[21] Appl. No.: 258,381

[22] Filed: Oct. 17, 1988

[51] Int. Cl.[5] ............................................. F15B 7/0
[52] U.S. Cl. ........................................ 60/533; 60/585; 60/592; 141/7; 141/61
[58] Field of Search ............... 60/584, 585, 592, 533; 188/352; 141/60, 61, 7, 8

[56] References Cited

U.S. PATENT DOCUMENTS

| | | | |
|---|---|---|---|
| 2,637,478 | 5/1953 | McGihon | 141/61 |
| 2,903,023 | 9/1959 | Battinich | 141/61 |
| 3,185,187 | 5/1965 | Luther | 141/61 X |
| 3,911,972 | 10/1975 | Hubers et al. | 141/7 |
| 4,017,329 | 4/1977 | Larson | 188/352 X |
| 4,407,125 | 10/1983 | Parsons | 60/592 |
| 4,415,071 | 11/1983 | Butler et al. | 188/352 |
| 4,452,377 | 6/1984 | Hurley et al. | 141/7 X |
| 4,497,176 | 2/1985 | Rubin et al. | 60/592 X |
| 4,503,678 | 3/1985 | Wimbush | 60/584 |
| 4,551,976 | 11/1985 | Nix et al. | 60/533 |
| 4,581,979 | 4/1986 | Compton et al. | 60/533 X |
| 4,599,860 | 7/1986 | Parsons | 60/586 X |
| 4,624,291 | 11/1986 | Compton et al. | 60/584 X |
| 4,665,802 | 5/1987 | Barker et al. | 60/533 X |
| 4,766,804 | 8/1988 | Barker | 60/533 X |
| 4,842,107 | 6/1989 | Buchanan et al. | 188/352 |
| 4,848,419 | 7/1989 | Damen | 141/61 |

*Primary Examiner*—Edward K. Look
*Assistant Examiner*—John E. Ryznic
*Attorney, Agent, or Firm*—Krass & Young

[57] ABSTRACT

A method and apparatus for filling a hydraulic control apparatus of the type including a reservoir, a diaphragm positioned in the reservoir, a master cylinder, a slave cylinder, and a conduit interconnecting the master cylinder and the slave cylinder. The apparatus is filled by the use of a filling head which is fitted into the open top of the reservoir and which includes a nozzle portion having an exterior surface enclosing a volume which approximates the volume of the diaphragm so that, following filling of the apparatus, removal of the filling head, and reinsertion of the diaphragm, the apparatus is automatically placed in a totally filled condition.

15 Claims, 3 Drawing Sheets

METHOD AND APPARATUS FOR PREFILLING HYDRAULIC CONTROL APPARATUS

BACKGROUND OF THE INVENTION

The present invention relates to hydraulic apparatus in general and more particularly to a hydraulic control apparatus comprising a hydraulic master cylinder and a hydraulic slave cylinder for operating a mechanism remotely located from the master cylinder, the hydraulic control apparatus being prefilled with hydraulic fluid and pretested prior to shipment to a motor vehicle manufacturer, for example, for installation in a motor vehicle.

It is now known to prefill with hydraulic fluid a motor vehicle clutch control apparatus comprising a master cylinder, a reservoir of hydraulic fluid and a slave cylinder for operating the throw out bearing of a mechanical diaphragm spring clutch. Such prefilled hydraulic control apparatus are shown for example in U.S. Pat. Nos. 4,407,125; 4,599,860; 4,503,678 and 4,506,507, all assigned to the assignee of the present application.

As is well known, prefilling with hydraulic fluid and pretesting hydraulic apparatus for operating motor vehicle mechanisms such as mechanical clutches presents the many advantages, for the motor vehicle manufacturer, of receiving a fully assembled mechanism comprising all of the components filled with hydraulic fluid and pretested for proper operation ready to install on a motor vehicle on the assembly line without requiring that the components be installed, separately connected by way of a flexible conduit, and filled after installation with hydraulic fluid while being purged of any atmospheric air contained in the apparatus.

Fast, efficient, and accurate prefilling of the hydraulic apparatus is critical to the commercialization of such prefilled control apparatus. Various filling methods are disclosed in the above-identified patents assigned to applicant's assignee. Specifically, in U.S. Pat. No. 4,407,125, liquid is supplied through the open top of the reservoir until the liquid bleeds out of a bleed port in the slave cylinder whereupon the filling is terminated. In U.S. Pat. Nos. 4,506,507 and 4,503,678, a port is provided in a side wall of the reservoir, vacuum is applied to the system through the port in the reservoir to evacuate the system, liquid is introduced into the system through the port, and the port is thereafter sealed with a plug which serves to allow flow of hydraulic fluid out of the reservoir upon excess pressure but prevents reverse flow.

Whereas the filling methods disclosed in these patents have proven to be generally satisfactory, there continues to be a need to improve the apparatus and methodology of filling to provide more reliable filling, less expensive filling, and faster filling.

SUMMARY OF THE INVENTION

This invention is directed to the provision of an improved method and apparatus for prefilling a hydraulic control apparatus.

The invention methodology is applicable to a hydraulic control apparatus of the type including a slave cylinder; a conduit connected at one end to the inlet port of the slave cylinder; a master cylinder connected at its discharge port to the other end of the conduit; and a reservoir assembly including a reservoir body connected to the master cylinder and having an open top, a diaphragm positioned in the open top of the reservoir body and extending downwardly into the hollow of the reservoir body, and a reservoir cap fitted over the open top of the reservoir body. According to the method of the invention, a unitary filling head is provided having a nozzle portion having an exterior surface enclosing a volume approximating the volume enclosed by the exterior surface of the diaphragm; with the reservoir cap and diaphragm removed from the reservoir body, the filling head is placed over the open top of the reservoir body with the nozzle portion extending downwardly into the hollow of the reservoir body; the hydraulic apparatus is filled with hydraulic fluid by delivery of hydraulic fluid through the nozzle portion of the filling head; the filling head is removed from the reservoir body; and the diaphragm and reservoir cap are reinstalled on the open top of the reservoir body. This methodology facilitates the filling operation by mimicking the diaphragm of the reservoir assembly with the nozzle portion of the filling head so that, following removal of the filling head and replacement of the diaphragm, the system is prefilled and essentially ready for operation.

According to a further feature of the invention, the volume enclosed by the nozzle portion of the filling head slightly exceeds the volume enclosed by the diaphragm and, following filling of the apparatus through the filling head and removal of the filling head, the piston of the slave cylinder is moved from its filling position toward the inlet port of the slave cylinder to a shipping position to establish the shipping height of the slave cylinder and establish the final fluid level in the reservoir body. The amount of fluid displaced backwardly into the reservoir by the movement of the slave cylinder piston equals the difference in the volumes enclosed by the nozzle portion of the filling head and the diaphragm so that, when the diaphragm is replaced within the reservoir body, the apparatus is totally filled.

According to a further feature of the invention, following placing of the filling head over the reservoir body and prior to filling the apparatus, the apparatus is evacuated through the filling head to ensure that the entire apparatus is devoid of air prior to the filling process and thereby ensure that the filling process will be complete.

According to a further feature of the invention, following the filling step, the filling head is withdrawn from the reservoir and residual fluid is scavenged from the portion of the circuit through which the fluid was delivered to the filling head to ensure that the evacuating step in the next filling cycle may be effectively carried out.

According to a further feature of the invention, following filling of the apparatus and movement of the piston rod of the slave cylinder to its shipping position, a shipping strap is provided between the main body of the slave cylinder and the piston rod of the slave cylinder to maintain the piston rod of the slave cylinder in its shipping position and maintain the desired fluid level in the reservoir.

According to a further feature of the invention, the shipping strap is provided with a weakened portion so that the strap will rupture at the weakened portion upon the first extension of the slave cylinder piston rod in response to actuation of the master cylinder.

The apparatus of the invention includes a fixture for holding the reservoir in an upright position; a filling head having a main body portion defining an annular downwardly facing sealing surface sized to match an annular sealing surface adjacent the open top of the reservoir and a nozzle portion extending downwardly from the main body portion, within the sealing surface, for entry into the hollow of the reservoir with the filling head sealing surface sealingly engaging the reservoir sealing surface; and means for moving the sealing head between a rest position removed from the reservoir and a filling position in which the filling head sealing surface sealingly engages the reservoir sealing surface and the nozzle portion extends downwardly into the hollow of the reservoir. This apparatus allows the methodology of the invention to be readily and efficiently carried out.

According to a further feature of the apparatus of the invention, the apparatus further includes evacuating means operative when actuated to establish a negative pressure at the filling head to allow evacuation of the hydraulic apparatus, and control means operative to alternatively actuate the filling means and the evacuating means. This arrangement allows the evacuation and filling steps of the invention methodology to be efficiently carried out.

According to a further feature of the apparatus of the invention, the filling means comprises a hydraulic cylinder sized when stroked to deliver a predetermined volume of hydraulic fluid to the filling head. This arrangement allows the desired quantity of fluid to be delivered to the apparatus in response to a simple stroking movement of the hydraulic cylinder.

DETAILED DESCRIPTION OF THE PREFERRED EMBODIMENT

Figure 1:
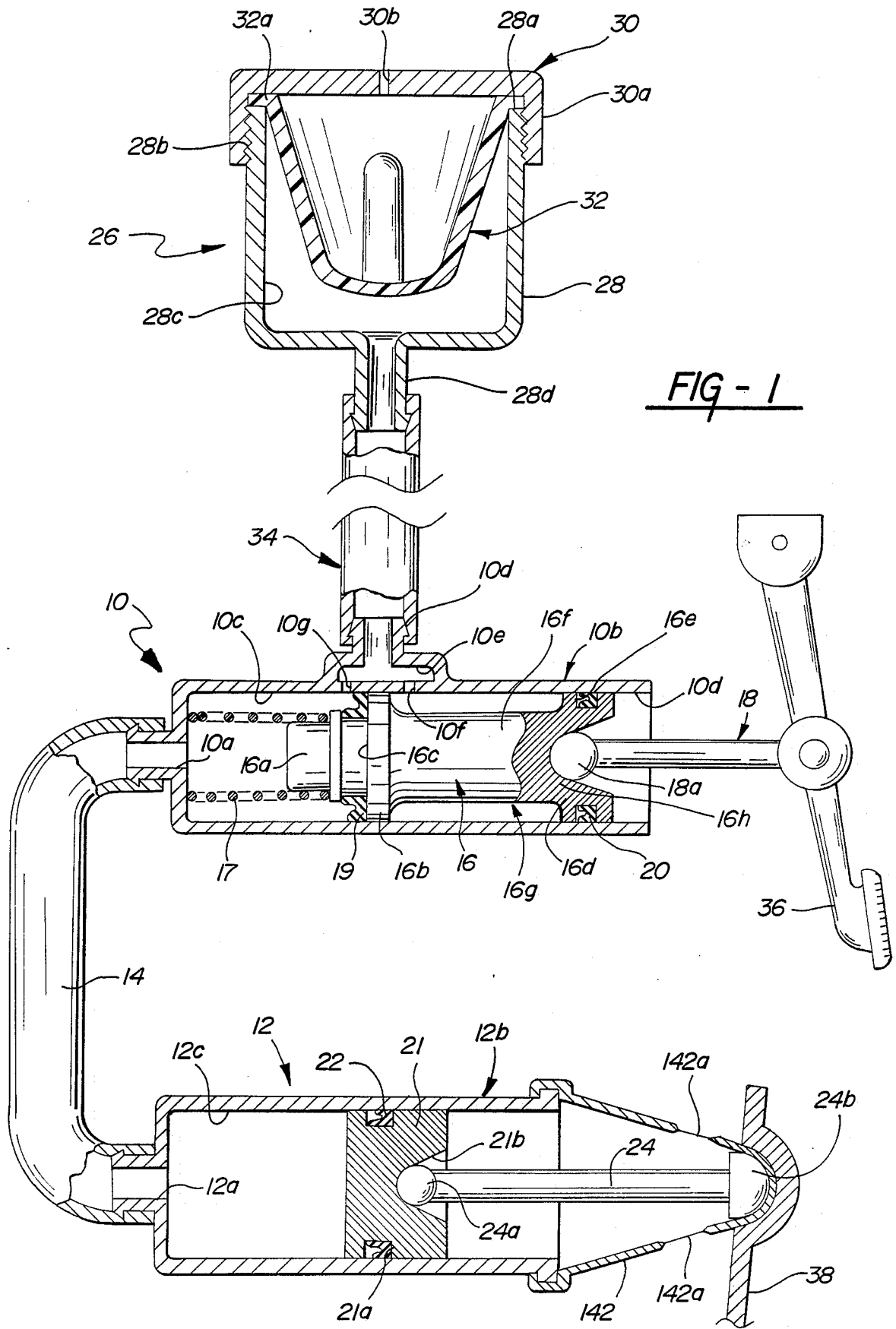
FIG. 1 is a somewhat schematic cross-sectional view of a hydraulic control apparatus of the type including a master cylinder, a slave cylinder, and a conduit interconnecting the master cylinder and the slave cylinder.

The invention method and apparatus are specifically applicable to a hydraulic control apparatus of the type, as seen in FIG. 1, including a master cylinder 10, a slave cylinder 12, and a conduit 14 interconnecting the discharge port 10a of the master cylinder with the inlet port 12a of the slave cylinder.

Hydraulic master cylinder 10, in addition to the cylinder main body 10b defining a bore 10c, includes a piston 16 slidably received in bore 10c and a coil spring 17 urging the piston 16 toward the open forward end of the cylinder 10d.

Piston 16 includes a nose portion 16a, a forward land portion 16b defining a seal groove 16c with nose portion 16a, a rearward land portion 16d defining a seal groove 16e, a main body spool portion 16f defining an annular chamber 16g with the bore 10c of the cylinder, and a socket 16h adapted to swivelly receive the forward end 18a of a piston or push rod 18. Elastomeric seals 19 and 20 are respectively received in seal grooves 16c and 16e.

Slave cylinder 12, in addition to the cylinder main body 12b defining a bore 12c, includes a piston 21 slidably received in bore 12c and defining a seal groove 21a and a socket 21b. Seal groove 21a receives a seal 22 and socket 21b receives the forward end 24a of a piston or push rod 24.

The hydraulic control apparatus of FIG. 1 also includes a reservoir assembly which, in known manner, may either be formed integrally with the master cylinder or may comprise a separate remote assembly interconnected to the master cylinder by a fluid conduit. The apparatus seen in FIG. 1 is of the remote reservoir type and includes a reservoir assembly 26 including a plastic reservoir body 28 of generally cup configuration, a plastic reservoir cap 30, and a diaphragm 32. Diaphragm 32 is formed of an elastomeric material and may for example be of the type shown in applicant's copending patent application U.S. Ser. No. 161,010, filed Feb. 26, 1988 and embodying a generally cruciferous cross-sectional configuration so as to allow ready flexing and expansion of the diaphragm to accommodate variations in the volume of the fluid in the system to ensure that the system remains filled with hydraulic fluid irrespective of wear in the system and irrespective of the manner in which the system is operated. Diaphragm 32 includes an annular lip 32a which is sized and configured to fit sealingly on top of the annular sealing surface 28a defined at the annular upper edge of the reservoir body 28. Diaphragm 32 is maintained in a position extending downwardly into the hollow 28c of reservoir body 28 by reservoir cap 30 which includes an internally threaded annular flange portion 30a which threadably coacts with threads 28b at the upper end of reservoir body 28 to firmly position diaphragm 32 within the hollow 28c of the reservoir body with diaphragm flange 32a firmly squeezed between the reservoir cap and the upper annular sealing surface 28a defined by the reservoir body. A port 30b in cap 30 ensures that the interior volume of diaphragm 32 is at all times exposed to atmospheric pressure.

The hydraulic control apparatus further includes a conduit 34 extending between a fitting 28c at the underside of reservoir body 20a and a fitting 10d provided on the cylinder body of master cylinder 10. Fitting 10d communicates in known manner with an annular chamber 10e which in turn communicates with radial ports 10f and 10g respectively disposed forwardly and rearwardly of piston rearward land portion 16b in the relaxed or retracted configuration of the master cylinder.

In a typical application of the hydraulic control apparatus of FIG. 1, the free end of master cylinder input rod 18 is secured to the clutch pedal 36 of a motor vehicle and the hemispherical free end 24b of the push rod of the slave cylinder is swivelly positioned in a socket portion 38a of a release lever 38 controlling the release bearing of a mechanical clutch of the vehicle so that the clutch is engaged and disengaged in known manner in response to pivotal movement of clutch pedal 36.

The hydraulic control apparatus of FIG. 1 is prefilled with hydraulic fluid, pretested, and delivered to the motor vehicle manufacturer as a fully assembled mechanism comprising all of the components filled with hydraulic fluid and pretested for proper operation, ready to install on a motor vehicle on the assembly line without requiring that the components be installed separately, connected by way of a flexible conduit, and filled after installation with hydraulic fluid while being purged of any atmospheric air contained in the apparatus.

Figure 2:
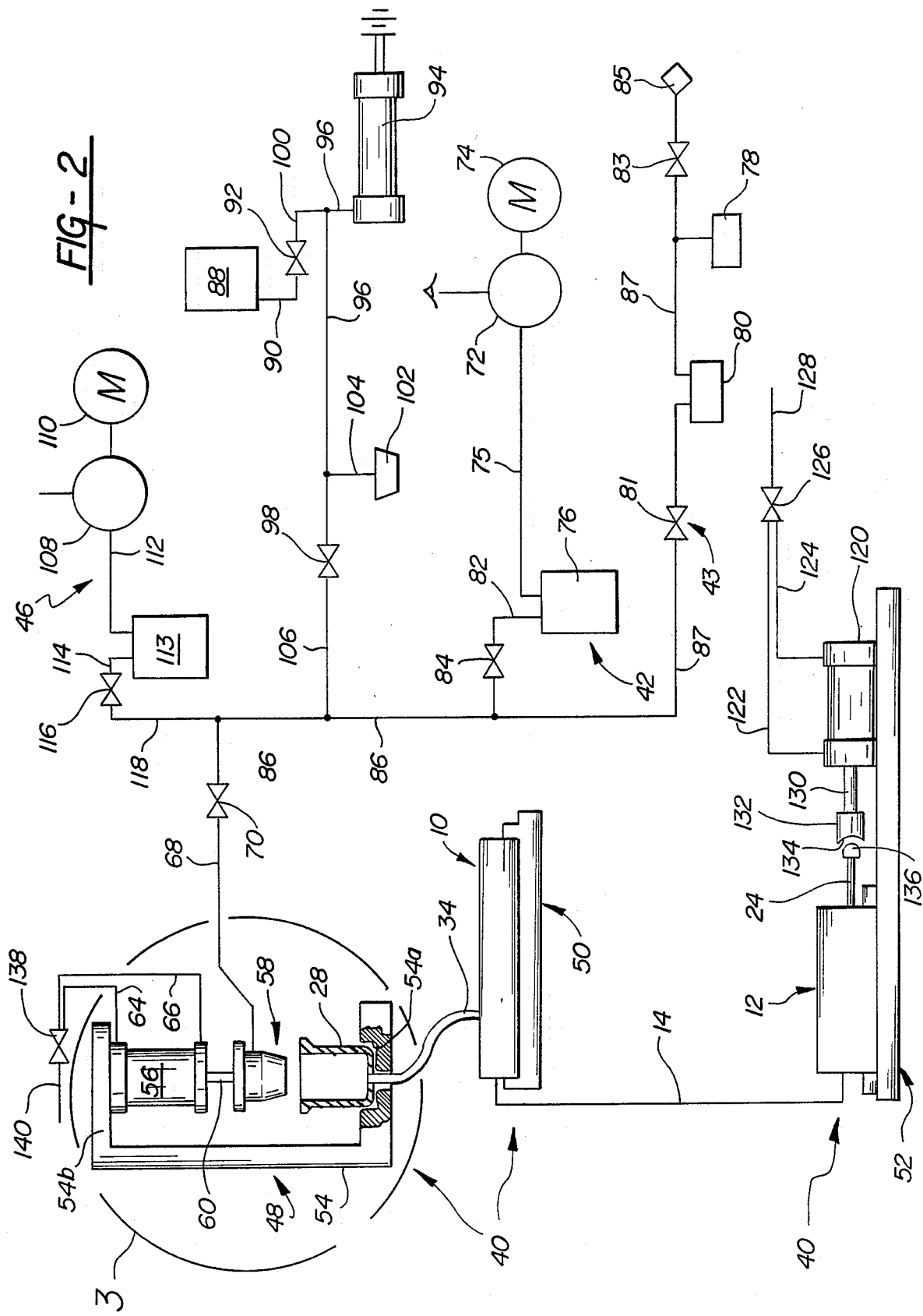
FIG. 2 is a diagrammatic view of an apparatus for filling the hydraulic control apparatus of FIG. 1.
Figure 3:
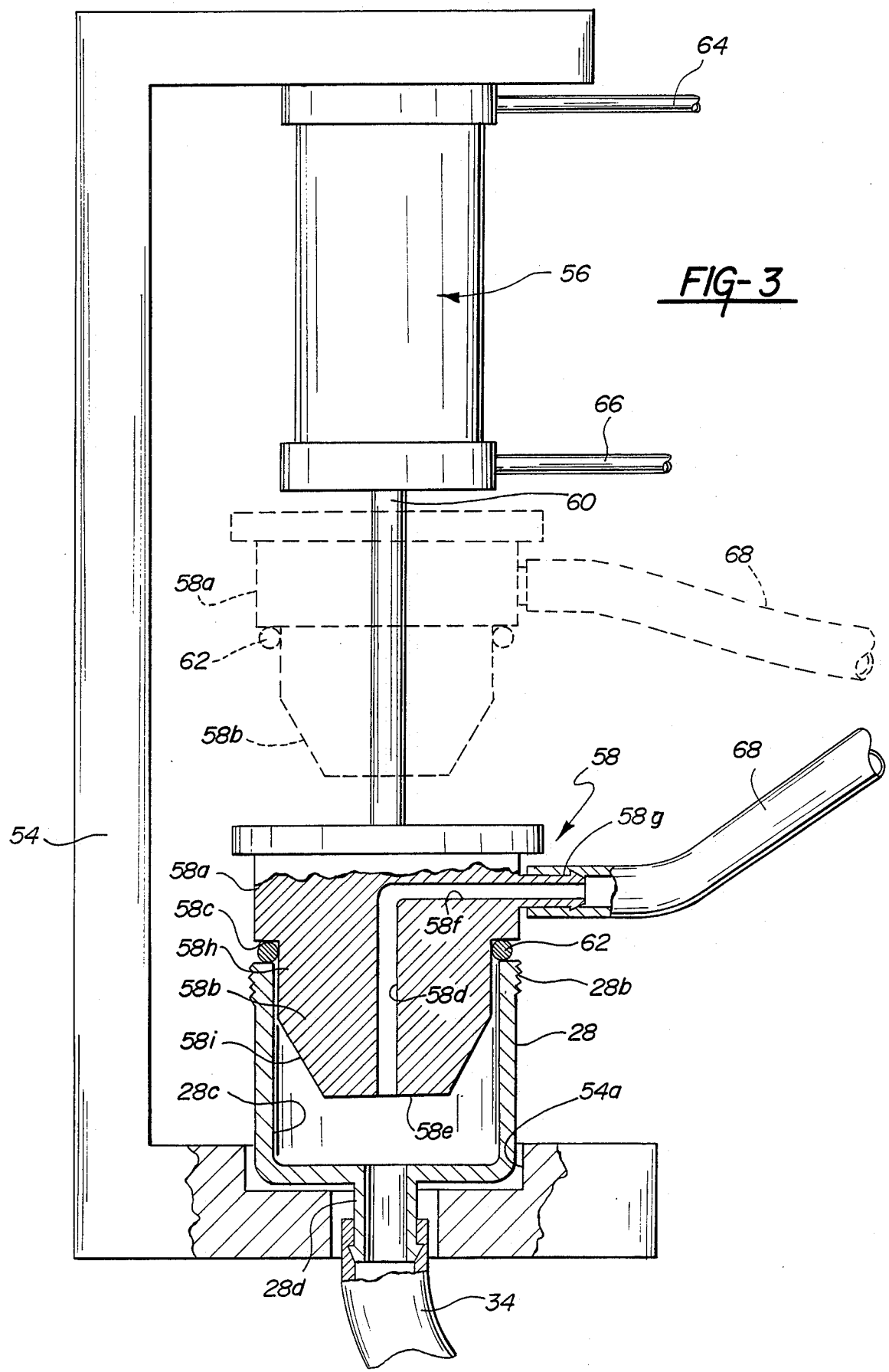
FIG. 3 is an enlarged view of the portion of the invention filling apparatus within the circle 3 of FIG. 2.

The invention method and apparatus for filling the control apparatus of FIG. 1 is seen in FIGS. 2 and 3.

The filling apparatus seen in FIGS. 2 and 3 includes a fixture 40, an evacuation system 42, a vacuum measurement system 43, a filling system 44, and a scavenging system 46.

Fixture 40 includes a reservoir fixture 48, a master cylinder fixture 50, and a slave cylinder fixture 52. Reservoir fixture 48 includes a frame member 54 defining a nest 54a for receipt of the lower end of reservoir body 28, a hydraulic cylinder 56 secured to and extending downwardly from an upper portion 54b of frame member 54, and a filling head 58 rigidly secured to the lower end of the piston rod 60 of hydraulic cylinder 56.

Filling head 56 includes a main body cylindrical portion 58a of generally circular cross-sectional configuration, a nozzle portion 58b, and a shoulder 58c at the intersection of main body portion 58a and nozzle portion 58b. Shoulder 58c defines an annular sealing surface for receipt of an O-ring 62. The sealing surface defined by shoulder 58c will be seen to extend around nozzle portion 58b at the upper end of the nozzle portion. A central axial passage 58d is provided in nozzle portion 58b opening at the lower face 58e of the nozzle portion and communicating at its upper end with a transverse passage 58f in main body portion 58a terminating in a fitting 58g on the exterior periphery of main body portion 58a. The size and configuration of nozzle portion 58b is selected such that the volume enclosed by the external surface of nozzle portion 58b approximates the volume enclosed by the external surface of diaphragm 32. The shape of nozzle portion 58b may if desired emulate the shape of diaphragm 32 but this shape correspondence is not necessary in so long as the enclosed volumes are approximately equal. Note in this regard that nozzle portion 58b, as disclosed, includes an upper substantially cylindrical portion 58h and a lower truncated conical portion 58i.

Fluid conduits 64 and 66 communicate with the upper and lower ends of hydraulic cylinder 56 to deliver fluid to cylinder 56 and remove fluid from cylinder 56 in known manner so as to provide a double action for the cylinder 56, and a conduit 68 connects at one end with fitting 58g of filling head 58 and connects at its other end to a solenoid valve 70.

Evacuation system 42 includes a vacuum pump 72 driven by an electric motor 74; a conduit 75 extending from vacuum pump 72 to a fluid trap 76; a further conduit 82 extending from fluid trap 76 to a solenoid valve 84; and a further conduit 86 extending from solenoid valve 84 to solenoid valve 70.

Vacuum measurement system 43 includes a conduit 87 connected to conduit 86 and extending in parallel to conduit 75; a solenoid valve 81; a fluid trap 80; a vacuum transducer 78; a further solenoid valve 83; and a vent to atmosphere 85.

Hydraulic fluid delivery system 44 includes a fluid storage facility 8 connected at its lower end by a conduit 90 to a solenoid valve 92; a hydraulic cylinder 94 having its outlet connected to a conduit 96 extending to a solenoid valve 98; a further conduit 100 connecting solenoid valve 92 to conduit 96; a pressure switch 102 connected to conduit 96 by a conduit 104; and a conduit 106 connecting solenoid valve 98 to conduit 86.

Scavenge system 46 includes a scavenge pump 108 driven by an electric motor 110; a conduit 112 connecting scavenge pump 108 to a scavenge fluid trap 113; a further conduit 114 connecting scaVenge fluid trap 113 to a solenoid valve 116; and a conduit 118 connecting solenoid valve 116 to conduit 86.

Fixture 50 is shown schematically and is intended to provide a nest for receipt of the master cylinder 10. In situations where the reservoir assembly is an integral part of the master cylinder, fixture 50 would of course form an integral part of fixture 48 so that the master cylinder main body would be received in a nest provided by the fixture with the reservoir body disposed in an upwardly opening disposition.

Fixture 52 is shown schematically and provides a nest for receipt of slave cylinder 12. Fixture 52 further mounts a hydraulic cylinder 120 connected by lines 122 and 124 to a solenoid valve 126 connected by a line 128 to a source of hydraulic fluid under pressure. The output piston rod 130 of hydraulic cylinder 120 includes a head 132 defining a concave forward face 134 for nesting receipt of the hemispherical head portion 24b of the slave cylinder piston rod 24.

The filling apparatus further includes a solenoid valve 138 connected by a line 140 to a source of fluid under pressure and communicating with conduits 64 and 66 to control the delivery of pressurized fluid to the opposite ends of the piston of hydraulic cylinder 56. The stroke of cylinder 56 is selected such that, in response to stroking movement of the piston rod 60 of the cylinder, the filling head 58a is moved between a rest position, seen in dotted lines in FIG. 3, where it is disposed clear of and above reservoir body 28, to a working position in which O-ring 62 is seated on the annular sealing surface 28a defined on the upper edge of a reservoir body 28 positioned in nest 54a and nozzle portion 58b extends downwardly into the hollow 28c of the reservoir body.

In the operation of the invention filling apparatus, reservoir body 28 is positioned in nest 54a of fixture 54 with cylinder 56 in its retracted position in which filling head 58 is raised; master cylinder 10 is placed in fixture 50 with conduit 34 interconnecting the reservoir body 28 and the master cylinder 10; and slave cylinder 12 is placed in fixture 52 with the hemispherical head 24b of the slave cylinder piston rod 24 nestingly positioned against the concave face 134 of head 132 of the piston rod 130 of hydraulic cylinder 120. The operator now initiates the filling operation utilizing suitable control circuitry, not shown. Upon the initiation of the filling operation, the cylinder 56 is first actuated in a manner to lower the filling head 58 from its raised position to its working position in which 0-ring 62 is sealed against the upper surface 28a of the reservoir body and the nozzle portion 58a is positioned within the hollow 28c of the reservoir body, whereafter solenoid valves 70, 81 and 84 are opened and the motor 74 is energized to operate vacuum pump 72 so as to create a vacuum condition at the lower face 58e of filling head 58 through passages 58d and 58f and through lines 68, valve 70, line 86, valve 84 and line 75 to evacuate the hydraulic control apparatus through the filling head 58 until the pressure within the control apparatus is reduced to a predetermined minimum level with the pressure in the system continuously being monitored by vacuum transducer 78 in line 87 of vacuum measurement system 43. As soon as the desired vacuum condition is achieved within the control apparatus, valves 84 is closed to isolate the control apparatus from the vacuum pump. After a time delay, the pressure is again monitored by the vacuum transducer 78 to check for leaks in excess of a predetermined level. If no leak is determined, the cycle continues to the next or filling operation. In the filling operation, solenoid valves 81, 84, 92, and 116 are closed, and solenoid valves 98 and 70 are opened to establish fluid communication between the output of hydraulic cylinder 94 and the filling head 58 through lines 96, solenoid valve 98, line 106, line 86, solenoid valve 70, and line 68. The hydraulic control apparatus is now filled with hydraulic fluid by a single stroking movement of the piston of the hydraulic cylinder 94 to move fluid through the described open conduit and valve path into the filling head and through passages 58f and 58d into the hydraulic control apparatus where the fluid fills the slave cylinder 12 behind the piston 21, fills the conduit 14, fills the master cylinder 10 in front of the piston 16 and in the annular chamber 16g, fills the conduit 34, and fills the volume of the reservoir body 28 defined beneath the nozzle portion 58d of the filling head. The dimensions of the cylinder 94 are chosen such that a single stroking movement of the piston of that cylinder measures out an exact quantity of hydraulic fluid which is precisely calculated to totally fill the hydraulic control apparatus.

As an alternative to designing the system such that a single stroke of the cylinder 94 is calculated to totally fill the system, the fill may be monitored on a pressure basis with fluid being delivered to the control apparatus in the described path until a predetermined pressure is sensed by pressure switch 102 whereafter the fill is stopped.

After the fill is complete, either by the use of a predetermined volume as measured by the stroke volume of cylinder 94 or by the sensing of a predetermined pressure in the system, valve 92 is opened and valves 81, 84, 98, and 70 are closed, whereafter the filling head 58 is withdrawn from the reservoir body and moved to its raised rest position by suitable actuation of the hydraulic cylinder 56 via solenoid valve 138. Following the withdrawal of the filling head, valve 116 is opened to scavenge fluid from the vacuum part of the circuit to prevent volatiles from boiling during the next cycle with the effect of reducing the vacuum achieved in the next filling cycle.

Prior to the commencement of the next filling cycle for the next hydraulic control apparatus, valve 83 is opened to vent line 87 to atmosphere through vent 85 and thereby release the vacuum in the system to reset the system, whereafter valve 83 is closed preparatory to the beginning of the next filling cycle for the next hydraulic control apparatus.

The shipping dimension of the slave cylinder is now set by opening valve 126 to actuate cylinder 120 to move the piston rod 130 of cylinder 120 to a predetermined forward stroking position during which the piston of the slave cylinder is moved a predetermined amount toward the discharge port of the slave cylinder with the result that a predetermined amount of hydraulic fluid is pushed back up through conduit 14 and through master cylinder 10 and conduit 34 into reservoir body 28 to raise the level of fluid in the reservoir body. As soon as the slave cylinder has been set to it shipping height, a plastic shipping strap 142 is positioned between the main body of the slave cylinder and the head 24b of the slave cylinder to maintain the slave cylinder in its adjusted shipping height position. Strap 142 includes reduced strength or weakened portions 142a. Diaphragm 32 and reservoir cap 30 are now reinstalled on the reservoir body 28 with the cap serving to firmly clamp the lip 32a of the reservoir between the cap and the sealing surface 28a on the upper annular edge of the reservoir body and with the diaphragm extending downwardly into the volume 28c of the reservoir body. Valve 126 is now suitably actuated to retract the piston rod 130 of cylinder 120 and the control apparatus, comprising the master cylinder 10, conduit 14, slave cylinder 12 and reservoir assembly 26, is removed from the fixture for delivery as a prefilled, pretested hydraulic control apparatus to a motor vehicle manufacturer for use, for example, as the actuating means for the release bearing of the clutch of the vehicle. The shipping strap 142 ruptures at the weakened portions 142a upon the first actuation of the master cylinder 10 following installation of the hydraulic control apparatus in the vehicle.

In general, the volume enclosed by the exterior surface of the nozzle portion 58b of the filling head 58 approximates the volume enclosed by the exterior surface of the diaphragm 32 so that as the filling head is removed from the reservoir body and the diaphragm is replaced in the reservoir body, the control apparatus maintains a totally filled disposition. Ideally, the volume enclosed by the nozzle portion 58b of the filling head slightly exceeds the volume enclosed by the diaphragm 32. Specifically, the difference in the volumes enclosed by nozzle portion 58b and diaphragm 32 is equal to the amount of fluid displaced backwardly up into the reservoir body 28 by the shipping height adjustment of the slave cylinder so that, when the diaphragm is replaced in the reservoir body following filling of the apparatus and following adjustment of the slave cylinder to its shipping height, the reservoir and the remainder of the control apparatus are automatically restored to a total filled configuration.

The invention filling method and filling apparatus will be seen to provide a filling procedure which is more reliable than the prior art procedures, allows the use of less expensive fixturing, and provides a shorter total lapsed time for the filling cycle.

Whereas a preferred embodiment of the invention has been illustrated and described in detail it will be apparent that various changes may be made in the disclosed embodiment without departing from the scope or spirit of the invention.

I claim:

1. A method of filling a hydraulic apparatus of type including a slave cylinder; a conduit connected at one end to the inlet port of the slave cylinder; a master cylinder connected at its discharge port to the other end of the conduit; and a reservoir assembly including a reservoir body connected to the master cylinder and having an open top, a diaphragm positioned in the open top of the reservoir body and extending downwardly into the hollow of the reservoir body and a reservoir cap fitted over the open top of the reservoir body, said method comprising the steps of:
   (A) providing a filling head having a nozzle portion having an exterior surface enclosing a volume approximating the volume enclosed by the exterior surface of said diaphragm;
   (B) with said cap and diaphragm removed from said reservoir body, placing said filling head over the open top of said reservoir body with said nozzle portion extending downwardly into the hollow of said reservoir body;
   (C) filling said hydraulic apparatus with hydraulic fluid through said nozzle portion of said filling head;
   (D) removing said filling head from said reservoir body; and
   (E) reinstalling said diaphragm and said cap on said reservoir body.

2. A method according to claim 1 and including the further steps of:
(F) Following filling of the apparatus, moving the piston of said slave cylinder from its filling position toward the inlet port of said slave cylinder to a shipping position to establish the shipping height of said slave cylinder and displace a quantity of fluid backwardly into said reservoir body to establish the final fluid level in said reservoir body.

3. A method according to claim 1 wherein:
(F) following placing of said filling head over said reservoir body and prior to filling said apparatus, said apparatus is evacuated through said filling head.

4. A method according to claim 1 wherein:
(F) said filling step is accomplished by delivering a predetermined quantity of fluid to said apparatus through said filling head.

5. A method according to claim 1 wherein:
(F) said filling step is accomplished by delivering fluid to said apparatus through said filling head until the pressure of the fluid achieves a predetermined value.

6. A method according to claim 2 wherein:
(G) following movement of said slave cylinder piston to its shipping position, a shipping strap is installed between the main body of said slave cylinder and the piston rod of said slave cylinder to maintain the slave cylinder at its predetermined shipping height.

7. A method according to claim 6 including the further step of:
(H) providing a weakened section in said shipping strap so that said strap will rupture at said weakened section upon the first extension of said slave cylinder piston rod in response to actuation of said master cylinder.

8. A method according to claim 1 wherein:
(F) following removal of said filling head from said reservoir body, fluid is scavenged from the circuit through which fluid was delivered to the reservoir body in the filling process.

9. A method according to claim 2 wherein:
(G) the volume enclosed by the exterior surface of said nozzle portion of said filling head exceeds the volume enclosed by the exterior surface of said diaphragm by an amount equal to the quantity of fluid displaced during movement of said slave cylinder piston to its shipping position.

10. A filling apparatus for filling a hydraulic apparatus of the type including an open top reservoir connected to a master cylinder, said apparatus comprising:

a fixture for holding the reservoir in an upright position;
a unitary filling head having a main body portion defining an annular downwardly facing sealing surface sized to match an annular sealing surface adjacent the open top of the reservoir and a nozzle portion rigid with said sealing surface and extending downwardly from said main body portion within said sealing surface to a location spaced below said sealing surface so as to extend into the hollow of the reservoir with said filling head sealing surface sealingly engaging the reservoir sealing surface;
means for moving said filling head between a rest position removed from the reservoir and a filling position in which said filling head sealing surface sealingly engages the reservoir sealing surface and said nozzle portion extends downwardly into the hollow of the reservoir; and
a passage in said unitary filling head extending from an entry end opening in the exterior of said head above said sealing surface to an exit end opening in the exterior of said filling head below said sealing surface.

11. An apparatus according to claim 10 wherein said apparatus further includes:
filling means operative when actuated to deliver hydraulic fluid to said filling head for deliver through said passage to the reservoir to fill the hydraulic apparatus;
evacuating means operative when actuated to establish a negative pressure at said filling head to allow evacuation of the hydraulic apparatus; and
control means operative to alternately actuate said filling means and said evacuating means.

12. An apparatus according to claim 11 wherein:
said filling means comprises a hydraulic cylinder sized when stroked to delivery a predetermined volume of said hydraulic fluid to said filling head.

13. A filling apparatus according to claim 11 wherein:
said filling head moving means comprises a power cylinder having its piston rod secured to said filling head.

14. A filling apparatus according to claim 11 wherein:
said evacuating means comprises a vacuum pump.

15. A filling apparatus according to claim 11 wherein:
said filling means comprises a hydraulic cylinder sized when stroked to deliver a predetermined volume of hydraulic fluid to said filling head;
said filling head moving means comprises a power cylinder having its piston rod secured to said filling head; and
said evacuating means comprises a vacuum pump.

* * * * *